United States Patent
Kim

(10) Patent No.: US 12,030,432 B2
(45) Date of Patent: Jul. 9, 2024

(54) VEHICLE FOR OUTPUTTING VIRTUAL ENGINE SOUND AND CONTROL METHOD THEREOF

(71) Applicants: Hyundai Motor Company, Seoul (KR); Kia Corporation, Seoul (KR)

(72) Inventor: Keunjin Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 319 days.

(21) Appl. No.: 17/533,759

(22) Filed: Nov. 23, 2021

(65) Prior Publication Data

US 2022/0266748 A1 Aug. 25, 2022

(30) Foreign Application Priority Data

Feb. 22, 2021 (KR) .................. 10-2021-0023531

(51) Int. Cl.
*F24H 3/02* (2022.01)
*B60K 11/04* (2006.01)
*B60Q 5/00* (2006.01)
*B60K 1/00* (2006.01)

(52) U.S. Cl.
CPC .............. *B60Q 5/008* (2013.01); *B60K 11/04* (2013.01); *B60K 1/00* (2013.01); *B60K 2001/005* (2013.01)

(58) Field of Classification Search
CPC .......... B60Q 5/008; B60K 11/04; B60K 1/00; B60K 2001/005
USPC ........................................ 165/121
See application file for complete search history.

(56) References Cited

U.S. PATENT DOCUMENTS

2006/0048984 A1 * 3/2006 Pleune .................. B60K 11/04
180/68.4

FOREIGN PATENT DOCUMENTS

KR 920008716 B1 * 10/1992
KR 10-2011-0122347 A 11/2011

* cited by examiner

*Primary Examiner* — Davis D Hwu
(74) *Attorney, Agent, or Firm* — Fox Rothschild LLP

(57) ABSTRACT

A vehicle includes: a cooling module including a first radiator and a second radiator arranged to be spaced apart from a rear of the first radiator; and a speaker module provided on one side of the cooling module to output a sound to a space between the first radiator and the second radiator.

19 Claims, 6 Drawing Sheets

VEHICLE FOR OUTPUTTING VIRTUAL ENGINE SOUND AND CONTROL METHOD THEREOF

CROSS-REFERENCE TO RELATED APPLICATION

This application claims under 35 U.S.C. § 119 the benefit of Korean Patent Application No. 10-2021-0023531, filed on Feb. 22, 2021 in the Korean Intellectual Property Office, the entire contents of which are incorporated herein by reference.

BACKGROUND

1. Technical Field

The disclosure relates to a vehicle that outputs a virtual engine sound and a control method thereof, more particularly, to the vehicle in which a cooling module and a speaker module are integrated and a control method thereof.

2. Description of the Related Art

In general, an electric vehicle is driven by a motor, and produces almost no noise due to a low noise characteristic of the motor. Therefore, even when the electric vehicle approaches, pedestrians may not recognize it because of low noise, which may lead to an increase in car accidents.

Accordingly, a virtual engine sound system (VESS) that virtually outputs an engine sound for the safety of pedestrians has been equipped with an electric vehicle.

The VESS may include a speaker module for outputting a virtual engine sound, and the speaker module may be generally mounted in a bumper of a vehicle.

When the speaker module is mounted to the bumper of the vehicle, poor applicability may be caused due to interference with the parts applied to the bumper, and the speaker module is required to have a relatively large size for omnidirectional sound output.

SUMMARY

The disclosure provides a vehicle in which a cooling module and a speaker module are integrated and a control method thereof.

Additional aspects of the disclosure will be set forth in part in the description which follows and, in part, will be obvious from the description, or may be learned by practice of the disclosure.

According to an embodiment of the disclosure, there is provided a vehicle, including: a cooling module including a first radiator and a second radiator arranged to be spaced apart from a rear of the first radiator; and a speaker module provided on one side of the cooling module to output a sound to a space between the first radiator and the second radiator.

The speaker module is provided below the cooling module to be arranged at a lower end of the first radiator and the second radiator.

The speaker module is configured to output the sound through an opening, and an overlapped area between the opening and the first radiator is larger than an overlapped area between the opening and the second radiator.

The opening is exposed to a front of the first radiator, exposed between the first radiator and the second radiator, and is not exposed to a rear of the second radiator.

A distance between a central axis of the speaker module and the first radiator is shorter than a distance between the central axis of the speaker module and the second radiator.

A height of the second radiator is greater than a height of the first radiator.

The sound output through the speaker module is radiated to the space between the first radiator and the second radiator and to a front of the first radiator.

The sound output through the speaker module is blocked by the second radiator and is not radiated to a rear of the second radiator.

The first radiator is configured to cool a battery, and the second radiator is configured to cool power electronics.

The first radiator and the second radiator are arranged in parallel.

The speaker module is configured to output a virtual engine sound, and a frequency band of the virtual engine sound output from the speaker module is pre-set based on a height of the first radiator and a distance between the first radiator and the second radiator.

The cooling module further includes a cooling fan for cooling the first radiator and the second radiator.

The vehicle further includes: a controller configured to control the speaker module based on operation information of the cooling fan and speed information of the vehicle.

The controller is configured to control the speaker module to output a virtual engine sound when a speed of the vehicle is equal to or less than a preset speed, and adjust a volume of the virtual engine sound based on the operation information of the cooling fan.

The controller is configured to adjust a volume of the virtual engine sound based on a rotation speed of the cooling fan.

The controller is configured to control the speaker module to output an anti-phase sound of a noise corresponding to a rotation speed of the cooling fan, when a speed of the vehicle is greater than a preset speed and the cooling fan is operating.

According to an embodiment of the disclosure, there is provided a control method of a vehicle including a cooling module including a first radiator, a second radiator arranged to be spaced apart from a rear of the first radiator and a cooling fan, and a speaker module provided on one side of the cooling module to output a sound to a space between the first radiator and the second radiator, the control method including: controlling the speaker module based on operation information of the cooling fan and speed information of the vehicle.

The controlling of the speaker module based on the operation information of the cooling fan and the speed information of the vehicle includes: controlling the speaker module to output a virtual engine sound, when a speed of the vehicle is equal to or less than a preset speed, and adjusting a volume of the virtual engine sound based on the operation information of the cooling fan.

The adjusting of the volume includes: adjusting the volume of the virtual engine sound based on a rotation speed of the cooling fan.

The controlling of the speaker module based on the operation information of the cooling fan and the speed information of the vehicle includes: controlling the speaker module to output an anti-phase sound of a noise corresponding to a rotation speed of the cooling fan, when a speed of the vehicle is greater than a preset speed and the cooling fan is operating.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
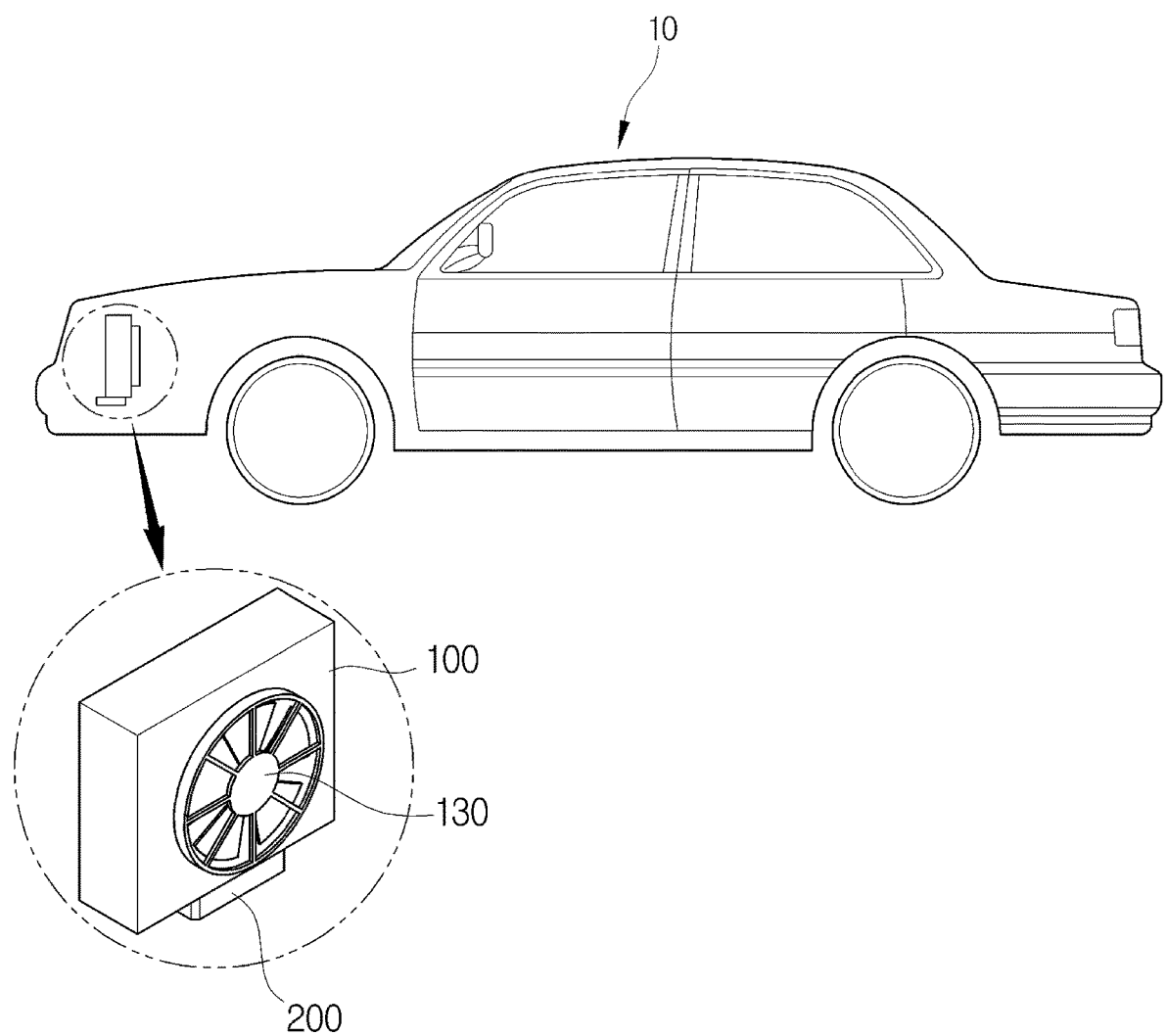
FIG. 1 is a diagram illustrating an appearance of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals throughout the specification denote like elements. Also, this specification does not describe all the elements According to various embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It is to be understood that the singular forms are intended to include the plural forms as well, unless the context clearly dictates otherwise.

Further, the terms such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, a vehicle and a control method of the vehicle according to an aspect of the disclosure will be described in detail with reference to the accompanying drawings.

FIG. 1 is a diagram illustrating an appearance of a vehicle according to an embodiment.

Referring to FIG. 1, the vehicle 10 may include a cooling module 100 and a speaker module 200.

According to an embodiment, the vehicle 10 may include a motor (not shown) driven by electricity, and be an electric vehicle powered by using the motor (not shown).

In this instance, the electric vehicle may be a battery electric vehicle (BEV), a hybrid electric vehicle (HEV), a plug-in HEV, and the like, and a type of electric vehicle is not limited, as long as it can obtain power from a motor.

According to an embodiment, the cooling module 100 and the speaker module 200 may be provided near a front bumper of the vehicle 10.

The cooling module 100 may manage heat generated from various components of the vehicle 10.

According to an embodiment, the cooling module 100 may cool heat emitted from a battery that provides power to the vehicle 10, and also cool heat emitted from power electronics (PE).

According to an embodiment, the PE may include at least one of an inverter, an on board charger (OBC), an electric power control unit (EPCU), and the motor configured to provide power to the vehicle 10.

The speaker module 200 may output various types of sound.

According to an embodiment, the speaker module 200 may output a virtual engine sound.

According to various embodiments, the speaker module 200 may be configured to reproduce a sound source in a high frequency band corresponding to the virtual engine sound.

Figure 2:
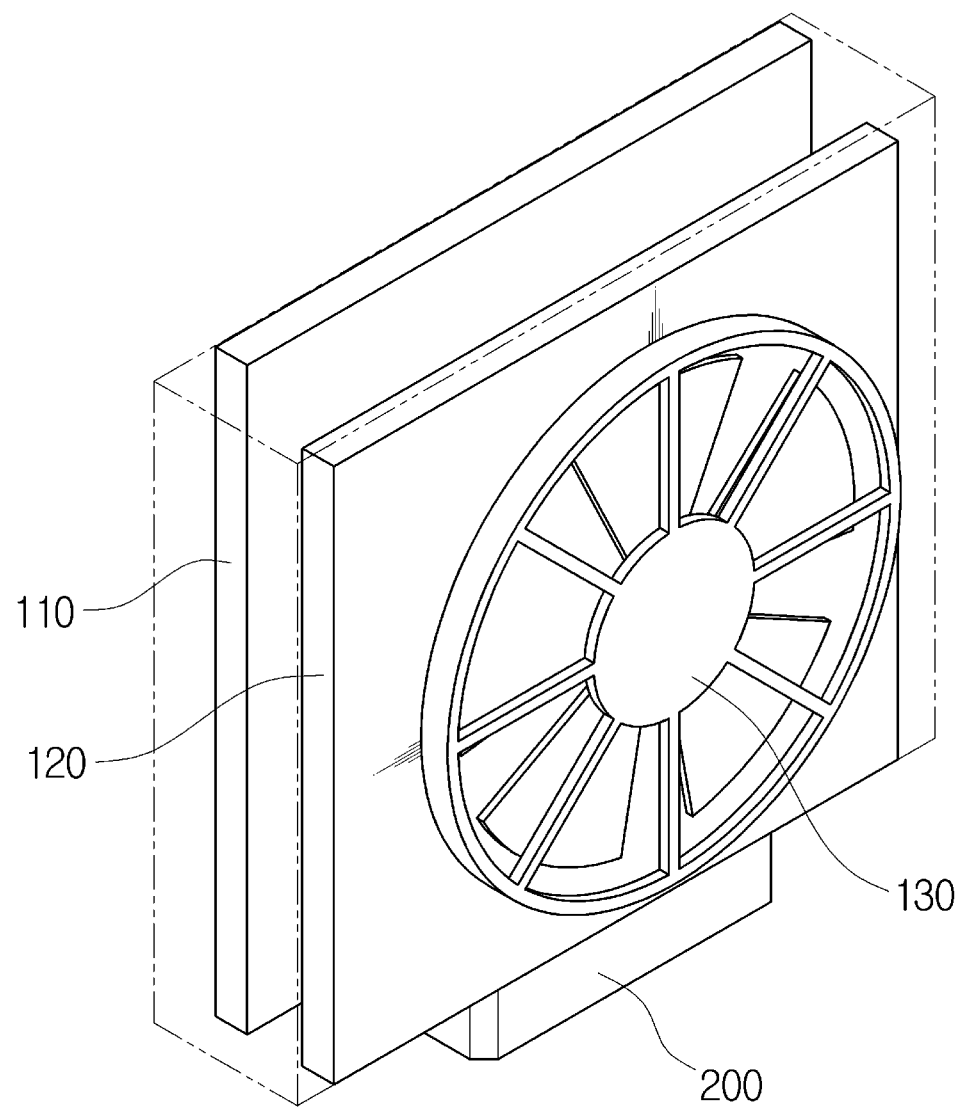
FIG. 2 is a perspective view illustrating a cooling module and a speaker module of a vehicle according to an embodiment.
Figure 3:
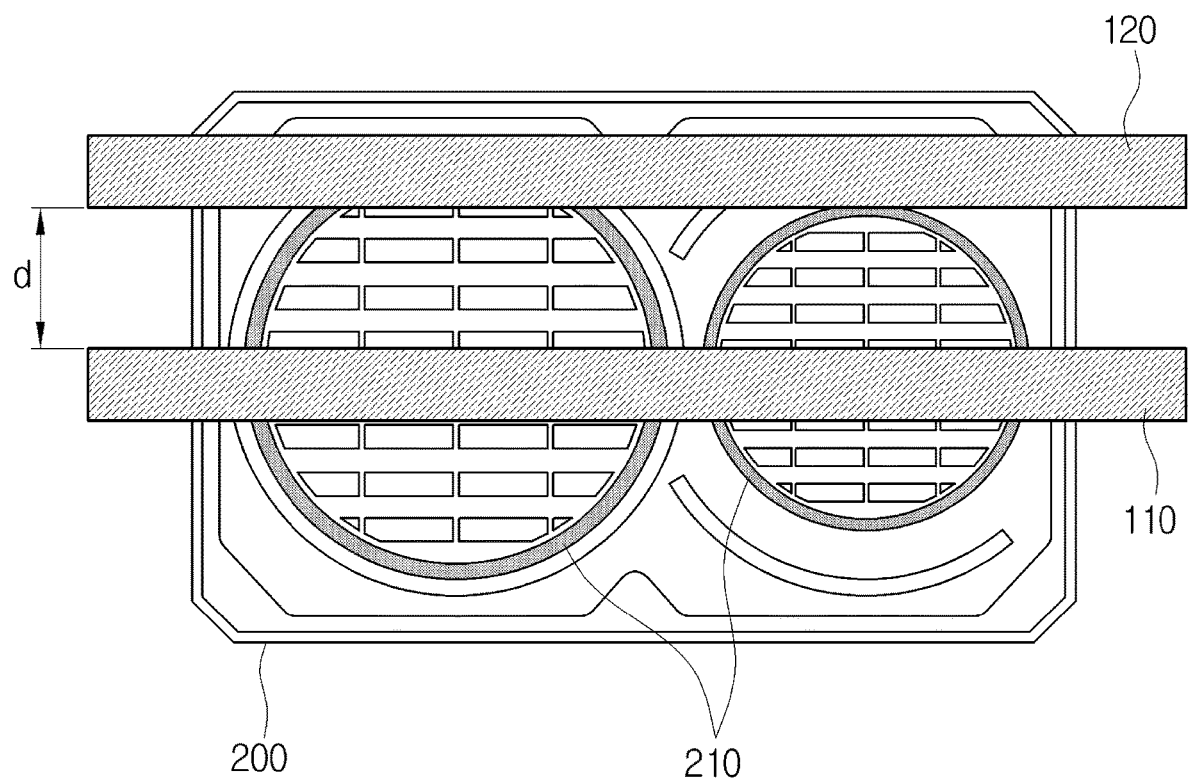
FIG. 3 is a top view illustrating a cooling module and a speaker module of a vehicle according to an embodiment.
Figure 4:
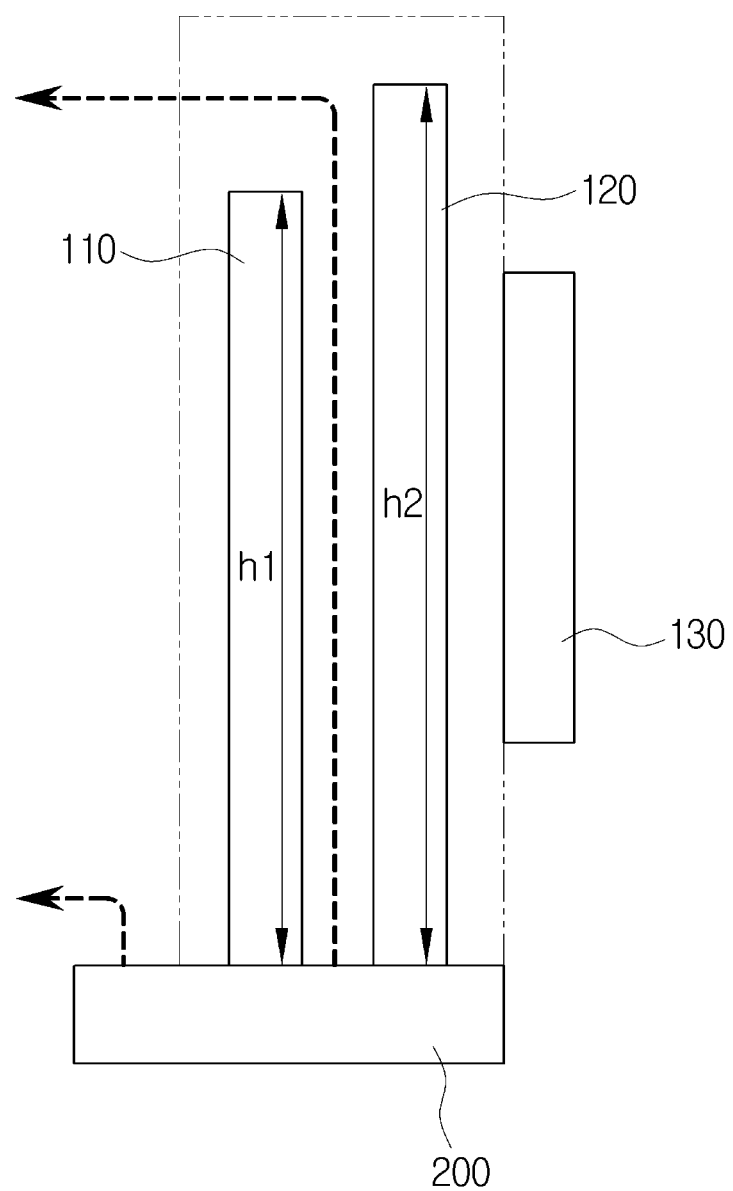
FIG. 4 is a side view illustrating a cooling module and a speaker module of a vehicle according to an embodiment.

FIG. 2 is a perspective view illustrating a cooling module and a speaker module of a vehicle according to an embodiment. FIG. 3 is a top view illustrating a cooling module and a speaker module of a vehicle according to an embodiment. FIG. 4 is a side view illustrating a cooling module and a speaker module of a vehicle according to an embodiment.

Referring to FIGS. 2 to 4, according to an embodiment, the cooling module 100 may include a first radiator 110, a second radiator 120 and a cooling fan 130. The second radiator 120 preferably is arranged to be spaced apart from a rear of the first radiator 110, and the cooling fan 130 preferably is arranged at a rear of the second radiator 120.

According to an embodiment, the second radiator 120 preferably is provided at the rear of the first radiator 110, and thereby may be closer to an inside of the vehicle 10.

Although not illustrated, the cooling module 100 may include other constituent components (e.g. a heat exchanger) for cooling various constituent components of the vehicle 10.

For example, the cooling module 100 may include a plurality of frames for fixing the first radiator 110, the second radiator 120 and the cooling fan 130.

According to an embodiment, the first radiator 110 may be a radiator for a battery (i.e., configured for cooling the battery), and the second radiator 120 may be a radiator for power electronics (i.e., configured for cooling the power electronics).

According to an embodiment, the first radiator 110 and the second radiator 120 may be connected to coolant lines different from each other, respectively.

For instance, the first radiator 110 may be connected to a first coolant line for cooling the battery, and the second radiator 120 may be connected to a second coolant line for cooling the power electronics.

The first radiator 110 and the second radiator 120 may be arranged in parallel to each other, and thus a distance d between the first radiator 110 and the second radiator 120 may be constant.

According to an embodiment, the cooling fan 130 may be arranged at the rear of the second radiator 120. The cooling fan 130 may cool the first radiator 110 and the second radiator 120 by cooling outside air heated by the first radiator 110 and the second radiator 120.

According to various embodiments, the number of cooling fans, the number of radiators and the configuration of the cooling module may be modified within a scope of the knowledge of one of ordinary skill in the art.

According to an embodiment, the speaker module 200 may be provided at one side of the cooling module 100 to output a sound to a space between the first radiator 110 and the second radiator 120.

According to various embodiments, the speaker module 200 may be provided below the cooling module 100 and be arranged at a lower end of the first radiator 110 and at a lower end of the second radiator 120. For instance, the speaker module 200 may be in contact with the lower end of the first radiator 110 and the second radiator 120.

The speaker module 200 may include an opening 210 to output the sound. That is, the speaker module 200 may output the sound through the opening 210.

According to an embodiment, the opening 210 of the speaker module 200 may face upward to output the sound to the space between the first radiator 110 and the second radiator 120.

According to an embodiment, a distance between a central axis of the speaker module 200 and the first radiator 110 may be shorter than a distance between the central axis of the speaker module 200 and the second radiator 120.

Accordingly, an overlapped area between the opening 210 of the speaker module 200 and the first radiator 110 may be larger than an overlapped area between the opening 210 and the second radiator 120.

The overlapped area between the opening 210 and the first radiator 110 may not only refer to an area where the opening 210 and the first radiator 110 are in physical contact, but also refer to an area where the opening 210 is covered by the first radiator 110, when viewed from above.

Likewise, the overlapped area between the opening 210 and the second radiator 120 may not only refer to an area where the opening 210 and the second radiator 120 are in physical contact, but also refer to an area where the opening 210 is covered by the second radiator 120, when viewed from above.

According to an embodiment, the first radiator 110 may cover the opening 210 to less than 25%, and the second radiator 120 may cover the opening 210 to less than 10%. Accordingly, the speaker module 200 may secure 65% or more of the opening 210.

According to an embodiment, the opening 210 of the speaker module 200 may be exposed to a front of the first radiator 110 and exposed between the first radiator 110 and the second radiator 120, without being exposed to a rear of the second radiator 120.

According to an embodiment, the sound output through the opening 210 of the speaker module 200 may be radiated to the space between the first radiator 110 and the second radiator 120 and to the front of the first radiator 110.

According to an embodiment, the sound output through the speaker module 200 may be blocked by the second radiator 120, and thereby may not be radiated to the rear of the second radiator 120.

According to various embodiments, the sound output through the speaker module 200 may not flow into the vehicle 10, or sound whose intensity is reduced may flow into the vehicle 10.

According to an embodiment, a height h1 of the first radiator 110 may be shorter than a height h2 of the second radiator 120. Accordingly, the sound output between the first radiator 110 and the second radiator 120 may be radiated to a front of the vehicle 10 through the space between the first radiator 110 and the second radiator 120.

According to an embodiment, when a preset condition is satisfied (e.g., gear in 'D' mode & vehicle speed <30 kph), the vehicle 10 may output a virtual engine sound through the speaker module 200.

A frequency band of the sound from the speaker module 200 may be set based on the height h1 of the first radiator 110 and the distance d between the first radiator 110 and the second radiator 120.

According to an embodiment, since the sound output through the speaker module 200 may be radiated to the front of the vehicle 10 through the space between the first radiator 110 and the second radiator 120, the space between the first radiator 110 and the second radiator 120 acts as a quarter wave tube, and thereby causes a resonance phenomenon. Accordingly, an intensity of the virtual engine sound may be amplified by resonating a specific frequency band of the virtual engine sound.

That is, the space between the first radiator 110 and the second radiator 120 acts as a quarter wave tube, and thereby may amplify the specific frequency band of the virtual engine sound.

According to an embodiment, the virtual engine sound may be set by a designer according to the height h1 of the first radiator 110 and the distance d between the first radiator 110 and the second radiator 120.

Arrangements and configurations of the cooling module 100 and the speaker module 200 have been described above.

According to various embodiments, the speaker module 200 outputting the virtual engine sound is mounted on one side of the cooling module 100, and thereby may reduce the virtual engine sound flowing into the vehicle 10 and amplify the virtual engine sound radiated to an outside of the vehicle 10.

Also, according to various embodiments, interference between a speaker module and parts applied to a bumper of a vehicle may be eliminated.

Further, according to various embodiments, a large size speaker module is not required, which is advantageous in vehicle design.

Hereinafter, a control method of the vehicle 10 according to an embodiment is described in detail.

Figure 5:
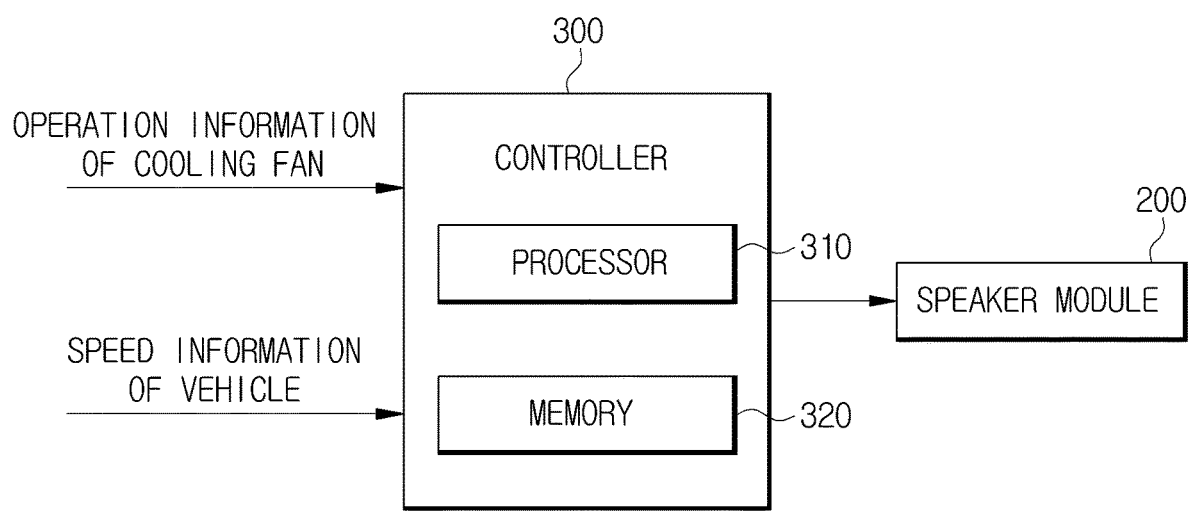
FIG. 5 is a control block diagram illustrating a vehicle according to an embodiment.
Figure 6:
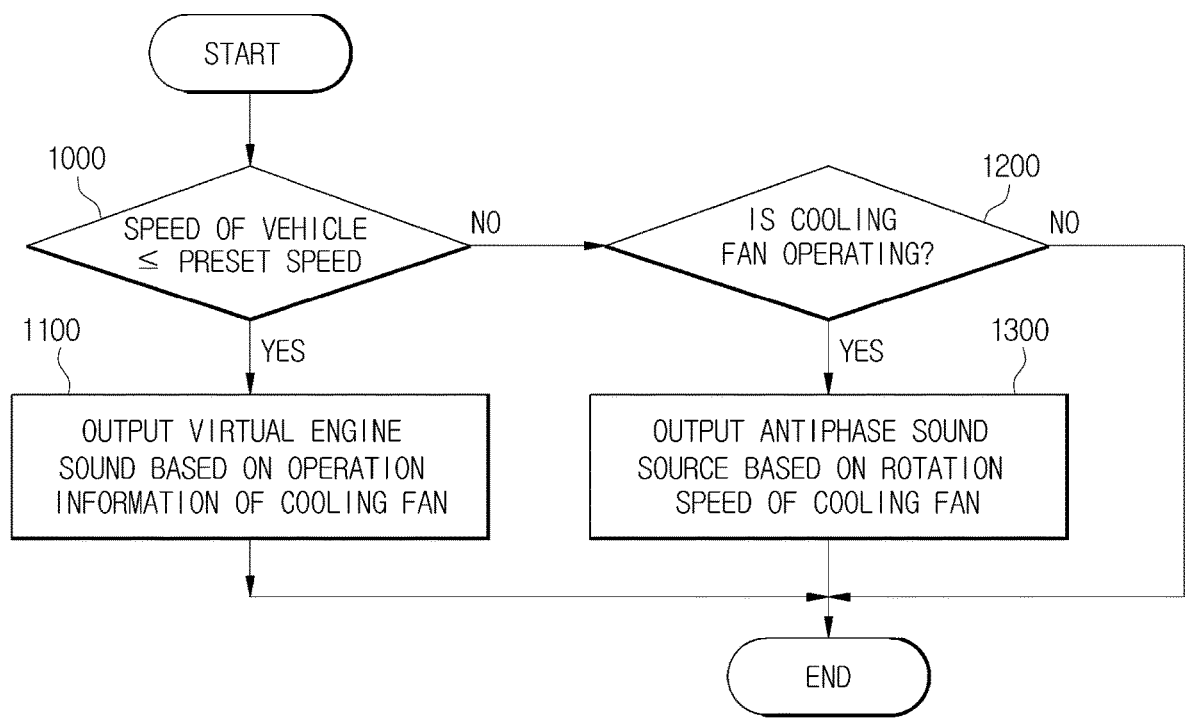
FIG. 6 is a flowchart illustrating a control method of a vehicle according to an embodiment.

FIG. 5 is a control block diagram illustrating a vehicle according to an embodiment. FIG. 6 is a flowchart illustrating a control method of a vehicle according to an embodiment.

Referring to FIG. 5, the vehicle 10 according to an embodiment may include a controller 300 and the speaker module 200.

According to various embodiments, the controller 300 may control various constituent components (e.g. the speaker module 200) of the vehicle 10 based on information and/or data acquired through a variety of communication methods.

According to an embodiment, the controller 300 may acquire speed information of the vehicle 10 from a vehicle speed sensor through a communication network (e.g., a controller area network (CAN) communication) of the vehicle 10, and operation information of the cooling fan 130 from a cooling fan controller.

The vehicle speed sensor may include a wheel sensor that senses a wheel speed of the vehicle 10.

According to an embodiment, the controller 300 may be an element of the speaker module 200, or an element separate from the speaker module 200.

According to an embodiment, the controller 300 may control the speaker module 200 of the vehicle 10 based on the operation information of the cooling fan 130 and the speed information of the vehicle 10.

The controller 300 may include at least one memory 320 storing a program for performing the aforementioned operations and operations described below, and at least one processor 310 implementing a stored program. When a plurality of memories 320 and processors 310 are provided, the plurality of memories 320 and processors 310 may be integrated into one chip or provided in physically separated locations.

The at least one memory 320 may store sound source data of a virtual engine sound and sound source data of an anti-phase sound of a noise corresponding to a rotation speed of the cooling fan 130.

The at least one processor 310 may include a signal processing processor for processing the sound source data stored in the at least one memory 320.

In addition, the controller 300 may include various types of electronic circuits (e.g. an analog-to-digital converter, a digital signal processor, and a phase inverter) for processing the sound source data.

Although the constituent components of the vehicle 10 have been described above, the vehicle 10 according to an embodiment may further include constituent components employable in the disclosure within a scope of an ordinary technology. Hereinafter, a control method of the vehicle 10 using the constituent components described above is described in detail.

Referring to FIG. 6, the controller 300 may control the speaker module 200 to output a virtual engine sound, when a speed of the vehicle 10 is equal to or less than a preset speed (e.g. 30 kph) (Yes in operation 1000).

As described above, sound source data of the virtual engine sound may be set in advance according to the height h1 of the first radiator 110 and the distance d between the first radiator 110 and the second radiator 120, and may be stored in the memory 320.

According to an embodiment, when the speed of the vehicle 10 is equal to or less than the preset speed (Yes in operation 1000), the controller 300 may control the speaker module 200 to output the virtual engine sound based on operation information of the cooling fan 130 (1100).

When the cooling fan 130 is operating, the virtual engine sound output from the speaker module 200 may not be efficiently transmitted to a pedestrian.

According to an embodiment, the controller 300 may control the speaker module 200 to enable a sound pressure level of the virtual engine sound when the cooling fan is operating to be greater than a sound pressure level of the virtual engine sound when the cooling fan does not operate. Accordingly, the virtual engine sound may be transmitted to the pedestrian more efficiently.

That is, the controller 300 may adjust a volume of the speaker module 200 based on whether the cooling fan 130 operates.

According to various embodiments, the controller 300 may adjust the volume of the speaker module 200 based on a rotation speed of the cooling fan 130.

As the rotation speed of the cooling fan 130 increases, a noise generated from the cooling fan 130 may increase. Accordingly, the controller 300 may increase the volume of the speaker module 200, as the rotation speed of the cooling fan 130 increases.

According to various embodiments of the disclosure, the virtual engine sound output from the speaker module 200 may be efficiently transmitted to the pedestrian.

When an output condition of the virtual engine sound is not satisfied, the controller 300 may control the speaker module 200 to output another sound, not the virtual engine sound, based on the operation information of the cooling fan 130.

According to an embodiment, when a speed of the vehicle 10 is greater than the preset speed (No in operation 1000) and the cooling fan 130 is operating (Yes in operation 1200), the controller 300 may control the speaker module 200 to output the anti-phase sound of the noise corresponding to the rotation speed of the cooling fan 130 (1300).

The cooling fan 130 may rotate at different rotation speeds depending on a particular situation.

According to an embodiment, sound source data of the anti-phase sound of the noise corresponding to the rotation speed of the cooling fan 130 may be stored in the memory 320.

Specifically, after collecting a noise signal generated by the cooling fan 130 according to the rotation speed of the cooling fan 130 using a microphone, and processing the noise signal collected through the microphone, the sound source data of the anti-phase sound of the noise corresponding to the rotation speed of the cooling fan 130 may be obtained and stored in the memory 320.

According to various embodiments, the vehicle 10 may include the microphone for measuring a noise generated from the cooling fan 130.

The controller 300 may receive the noise signal collected through the microphone provided close to the cooling fan 130, and transmit the noise signal to the speaker module 200 through a phase inverter. Accordingly, the controller 300 may control the speaker module 200 to output the anti-phase sound of the noise corresponding to the rotation speed of the cooling fan 130.

According to various embodiments, when the output condition of the virtual engine sound is not satisfied, the noise generated from the cooling fan 130 may be reduced using the speaker module 200.

As is apparent from the above, according to an embodiment of the disclosure, the vehicle and the control method thereof can increase an output efficiency of a virtual engine sound.

According to an embodiment of the disclosure, the vehicle and the control method thereof can eliminate an interference between a speaker module and parts applied to a bumper.

According to an embodiment of the disclosure, the vehicle and the control method thereof can reduce a virtual engine sound flowing into the vehicle.

According to an embodiment of the disclosure, the vehicle and the control method thereof can reduce a noise of a cooling fan flowing into the vehicle.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
a cooling module comprising a first radiator and a second radiator arranged to be spaced apart from a rear of the first radiator; and
a speaker module provided on one side of the cooling module to output a sound to a space between the first radiator and the second radiator;
wherein the speaker module is configured to output a virtual engine sound, and a frequency band of the virtual engine sound output from the speaker module is pre-set based on a height of the first radiator and a distance between the first radiator and the second radiator.

2. The vehicle of claim 1, wherein the speaker module is provided below the cooling module to be arranged at a lower end of the first radiator and a lower end of the second radiator.

3. The vehicle of claim 2, wherein the speaker module is configured to output the sound through an opening, and an overlapped area between the opening and the first radiator is larger than an overlapped area between the opening and the second radiator.

4. The vehicle of claim 3, wherein the opening is exposed to a front of the first radiator, exposed between the first radiator and the second radiator, and is not exposed to a rear of the second radiator.

5. The vehicle of claim 1, wherein a distance between a central axis of the speaker module and the first radiator is shorter than a distance between the central axis of the speaker module and the second radiator.

6. The vehicle of claim 1, wherein a height of the second radiator is greater than a height of the first radiator.

7. The vehicle of claim 1, wherein the sound output through the speaker module is radiated to the space between the first radiator and the second radiator and to a front of the first radiator.

8. The vehicle of claim 1, wherein the sound output through the speaker module is blocked by the second radiator and is not radiated to a rear of the second radiator.

9. The vehicle of claim 1, wherein the first radiator is configured to cool a battery, and the second radiator is configured to cool power electronics.

10. The vehicle of claim 1, wherein the first radiator and the second radiator are arranged in parallel.

11. The vehicle of claim 1, wherein the cooling module further comprises a cooling fan for cooling the first radiator and the second radiator.

12. The vehicle of claim 11, further comprising:
a controller configured to control the speaker module based on operation information of the cooling fan and speed information of the vehicle.

13. The vehicle of claim 12, wherein the controller is configured to control the speaker module to output the virtual engine sound when a speed of the vehicle is equal to or less than a preset speed, and
adjust a volume of the virtual engine sound based on the operation information of the cooling fan.

14. The vehicle of claim 13, wherein the controller is configured to adjust the volume of the virtual engine sound based on a rotation speed of the cooling fan.

15. The vehicle of claim 12, wherein the controller is configured to control the speaker module to output an anti-phase sound of a noise corresponding to a rotation speed of the cooling fan, when a speed of the vehicle is greater than a preset speed and the cooling fan is operating.

16. A control method of a vehicle comprising a cooling module having a first radiator, a second radiator arranged to be spaced apart from a rear of the first radiator and a cooling fan, and a speaker module provided on one side of the cooling module to output a sound to a space between the first radiator and the second radiator, the control method comprising:
controlling the speaker module based on operation information of the cooling fan and speed information of the vehicle;
wherein the speaker module is configured to output a virtual engine sound, and a frequency band of the virtual engine sound output from the speaker module is pre-set based on a height of the first radiator and a distance between the first radiator and the second radiator.

17. The control method of claim 16, wherein the controlling of the speaker module comprises:
controlling the speaker module to output the virtual engine sound, when a speed of the vehicle is equal to or less than a preset speed, and
adjusting a volume of the virtual engine sound based on the operation information of the cooling fan.

18. The control method of claim 17, wherein the adjusting of the volume comprises:
adjusting the volume of the virtual engine sound based on a rotation speed of the cooling fan.

19. The control method of claim 16, wherein the controlling of the speaker module comprises:
controlling the speaker module to output an anti-phase sound of a noise corresponding to a rotation speed of the cooling fan, when a speed of the vehicle is greater than a preset speed and the cooling fan is operating.

* * * * *